United States Patent
Tseng et al.

(10) Patent No.: US 8,461,956 B2
(45) Date of Patent: Jun. 11, 2013

(54) OVER-CURRENT PROTECTION DEVICE

(75) Inventors: Chun Teng Tseng, Sanwan Township, Miaoli County (TW); David Shau Chew Wang, Taipei (TW)

(73) Assignee: Polytronics Technology Corp., Hsinchu (TW)

( * ) Notice: Subject to any disclaimer, the term of this patent is extended or adjusted under 35 U.S.C. 154(b) by 193 days.

(21) Appl. No.: 13/186,721

(22) Filed: Jul. 20, 2011

(65) Prior Publication Data

US 2013/0021703 A1 Jan. 24, 2013

(51) Int. Cl.
*H01H 85/04* (2006.01)
*H01H 85/02* (2006.01)
*H01H 37/76* (2006.01)

(52) U.S. Cl.
USPC ...... 337/5; 337/4; 337/35; 337/167; 337/142; 337/102; 337/107; 337/296; 361/93.7; 361/93.8; 361/103; 361/104; 361/106; 338/22 R; 338/328

(58) Field of Classification Search
USPC ................. 337/4, 5, 6, 20, 35, 102, 107, 142, 337/167, 401, 186, 187, 296, 414; 361/93.7, 361/93.8, 103, 104, 106; 338/22 R, 328
See application file for complete search history.

(56) References Cited

U.S. PATENT DOCUMENTS

| | | | | |
|---|---|---|---|---|
| 3,786,388 A | * | 1/1974 | Sato | 337/269 |
| 3,828,289 A | * | 8/1974 | Hickling | 337/5 |
| 3,931,602 A | * | 1/1976 | Plasko | 337/163 |
| 4,472,705 A | * | 9/1984 | Carlson | 337/299 |
| 4,720,759 A | * | 1/1988 | Tabei | 361/105 |
| 5,963,122 A | * | 10/1999 | Endo et al. | 337/198 |
| 6,011,458 A | * | 1/2000 | Endo et al. | 337/198 |
| 6,127,913 A | * | 10/2000 | Niino et al. | 337/343 |
| 6,144,283 A | * | 11/2000 | Matsumura | 337/198 |
| 6,211,770 B1 | * | 4/2001 | Coyle | 338/21 |
| 6,252,488 B1 | * | 6/2001 | Ziegler et al. | 337/5 |
| 6,300,859 B1 | * | 10/2001 | Myong et al. | 337/182 |
| 6,430,019 B1 | * | 8/2002 | Martenson et al. | 361/124 |
| 6,445,277 B1 | * | 9/2002 | Ishikawa et al. | 337/297 |
| 6,507,264 B1 | * | 1/2003 | Whitney | 337/159 |
| 6,566,995 B2 | * | 5/2003 | Furuuchi et al. | 337/183 |
| 6,700,766 B2 | * | 3/2004 | Sato | 361/93.1 |
| 6,707,370 B2 | * | 3/2004 | Ritt et al. | 337/299 |
| 6,794,980 B2 | * | 9/2004 | Chu et al. | 338/22 R |
| 6,922,131 B2 | * | 7/2005 | Walsh et al. | 337/167 |
| 7,088,216 B2 | * | 8/2006 | Furuuchi | 337/183 |
| 7,477,503 B2 | * | 1/2009 | Aszmus | 361/124 |
| 7,515,029 B2 | * | 4/2009 | Sahashi et al. | 337/89 |
| 7,529,072 B2 | * | 5/2009 | Nishikawa | 361/104 |

(Continued)

FOREIGN PATENT DOCUMENTS

JP 2002218647 A * 8/2002

*Primary Examiner* — Anatoly Vortman
(74) *Attorney, Agent, or Firm* — Egbert Law Offices, PLLC

(57) ABSTRACT

An over-current protection device includes a first conductive member, a second conductive member, a resistive device and a temperature sensing switch. The first conductive member includes a first electrode foil and a second electrode foil those are formed on a same plane. The resistive device is laminated between the first conductive member and the second conductive member and exhibits positive temperature coefficient or negative temperature coefficient behavior. The temperature sensing switch can switch the first electrode foil and the second electrode foil between electrically conductive status and current-restriction status, e.g., open circuit, according to temperature variation. The threshold temperature of the temperature sensing switch is lower than the trip temperature of the resistive device.

17 Claims, 3 Drawing Sheets

U.S. PATENT DOCUMENTS

| | | | |
|---|---|---|---|
| 7,728,709 B2 * | 6/2010 | Grunbichler et al. | 337/4 |
| 7,741,946 B2 * | 6/2010 | Ho | 337/5 |
| 7,920,044 B2 * | 4/2011 | Scheiber et al. | 337/186 |
| 8,289,122 B2 * | 10/2012 | Matthiesen et al. | 337/167 |
| 8,400,252 B2 * | 3/2013 | Jung et al. | 337/186 |
| 2002/0109576 A1 * | 8/2002 | Wang et al. | 338/22 R |
| 2008/0253050 A1 * | 10/2008 | Yu et al. | 361/93.8 |

* cited by examiner

OVER-CURRENT PROTECTION DEVICE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present application relates to a passive component, and more particularly to an over-current protection device.

2. Description of Related Art Including Information Disclosed Under 37 CFR 1.97 and 37 CFR 1.98.

Thermistors are used to protect circuits to avoid over-temperature or over-current damages. A thermistor typically includes two electrodes and a resistive material between them. This resistive material has low resistance at room temperature, and the resistance will abruptly increase to a thousand times when the temperature reaches a threshold temperature or over-current occurs in the circuits, so as to suppress over-current for circuit protection.

When the temperature decreases to room temperature or over-current no longer exists, the thermistor returns to low resistance. Then the circuit operates normally. In view of the advantage of recovery, thermistors can replace fuses to be widely used in high density circuits.

The trip of the thermistor mainly depends on the composition thereof. In consideration of the need of low working temperature for batteries, low-temperature materials having low trip temperatures are often used. As a result, the hold current of the themistor is decreased. For battery applications, thermistors with high hold currents at high temperatures, e.g., 60° C. or 70° C., and rapid trip below 80° C. are required. However, it is difficult to obtain such thermistors by merely modifying the composition therein. High hold currents can be achieved by using high-temperature material such as high density polyethylene (HDPE), but the high-temperature material cannot meet the requirement of rapid trip below 80° C. If low-temperature material such as low density polyethylene (LDPE) is used, rapid trip below 80° C. can be achieved; however, high hold current at 60-70° C. is not obtainable. Therefore, it is difficult to achieve not only high hold current but also low-temperature trip for over-current protection.

BRIEF SUMMARY OF THE INVENTION

The present application provides an over-current protection device with high hold current and low temperature trip function.

An over-current protection device includes a first conductive member, a second conductive member, a resistive device and a temperature sensing switch. The first conductive member includes a first electrode foil and a second electrode foil formed on the same plane. The resistive device is laminated between the first conductive member and the second conductive member and exhibits positive temperature coefficient or negative temperature coefficient behavior. The temperature sensing switch can switch the first electrode foil and the second electrode foil between conductive status and current-restriction status, e.g., open circuit, according to temperature variation. The temperature for switching between conductive status and current-restriction status is a threshold temperature. The threshold temperature of the temperature sensing switch is lower than the trip temperature of the resistive device.

When the temperature sensing switch is in conductive status, current goes through a conductive path of the first electrode foil, the resistive device and the second conductive member and a conductive path of the second electrode foil, the resistive device and the second conductive member. When over-current occurs in the conductive paths, the resistive device is tripped from low resistance status to high resistance status for over-current protection. When over-current is gone, the resistive device is returned to low resistance status.

When the temperature of the temperature sensing switch exceeds the threshold temperature, the temperature sensing switch is switched to current-restriction status. Current instantly goes through the conductive path of the first electrode foil, the resistive device and the second conductive member and generates heat to trip the resistive device from low resistance to high resistance status. When the temperature is decreased to below the threshold temperature, the resistive device is returned to low resistance status.

In an embodiment, the over-current protection devices of the present application may use electrode foils of different areas to form conductive paths of different resistances. Accordingly, the resistive device can use high temperature material to obtain high hold current and low temperature trip function, so as to increase the voltage endurance and lifetime of the over-current protection devices.

BRIEF DESCRIPTION OF THE SEVERAL VIEWS OF THE DRAWINGS

The present application will be described according to the appended drawings in which.

DETAILED DESCRIPTION OF THE INVENTION

Figure 1A:
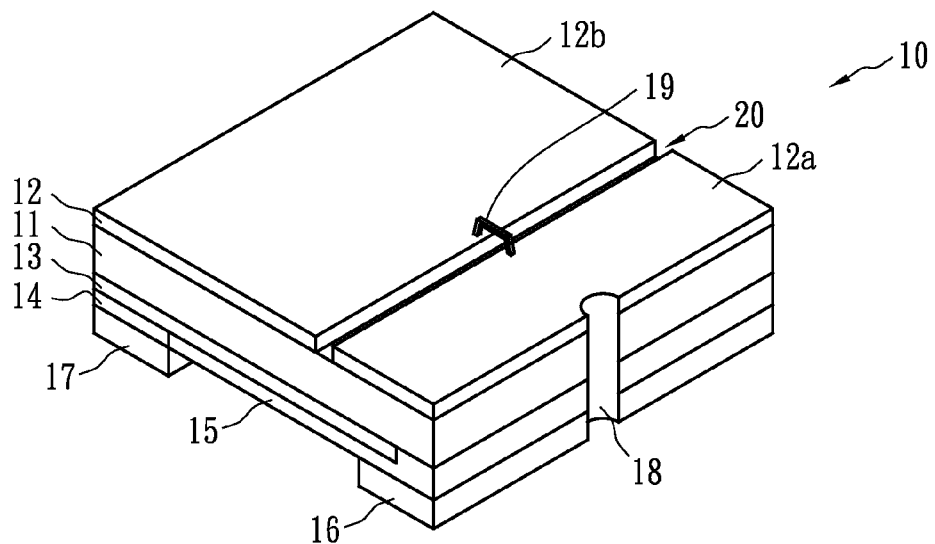
FIGS. 1A through 1C show an over-current protection device in accordance with a first embodiment of the present application.
Figure 1B:
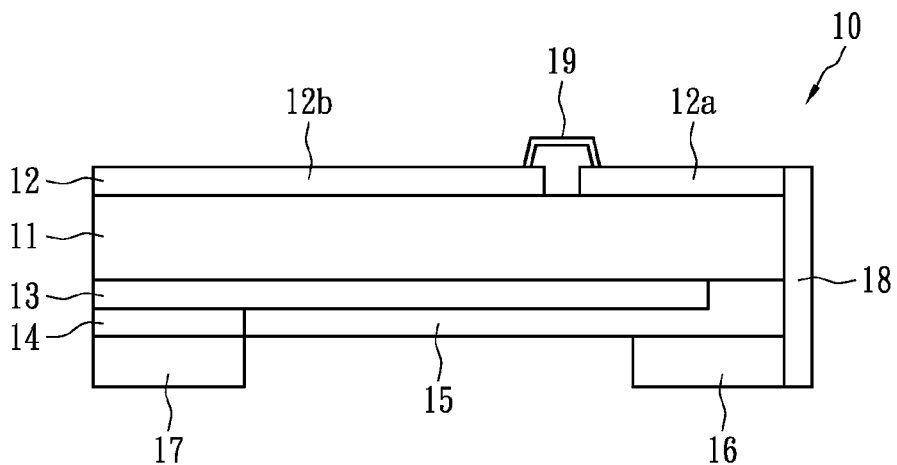

FIG. 1A shows an over-current protection device 10 in accordance with a first embodiment of the present application, which is a surface-mount device (SMD). FIG. 1B is a front view of the over-current protection device 10. The over-current protection device 10 includes a resistive device 11, a first conductive member 12, a second conductive member 13, a conductive layer 14, an insulative layer 15, a first outer electrode 16, a second outer electrode 17, a conductive connecting member 18 and a temperature sensing switch 19. The resistive device 11 is laminated between the first conductive member 12 and the second conductive member 13. The first outer electrode 16 and the second outer electrode 17 are formed on a same side of the second conductive member 13, i.e., a lower side of the device, and serve as interfaces for connecting to power. The conductive layer 14 electrically connects the second conductive member 13 and the second outer electrode 17. The first conductive member 12 includes a first electrode foil 12a and a second electrode foil 12b. The first electrode foil 12a and the second electrode foil 12b are formed on a same plane and are separated by a gap 20. In an embodiment, the area of the first electrode foil 12a is smaller than that of the second electrode foil 12b. The insulative layer 15 is formed between the first outer electrode 16 and the second conductive member 13 for insulation. The conductive connecting member 18 in this embodiment is a semi-circular hole plated with a conductive film, and connects the first outer electrode 16 and the first electrode foil 12a for electrical conduction therebetween. The temperature sensing switch 19 is disposed on a surface of the first conductive member 12 and has a threshold temperature lower than the trip temperature of the resistive device 11. In an embodiment, the temperature sensing switch 19 activates by sensing environment temperature. When the temperature of the temperature sensing switch 19 is lower than the threshold temperature, the temperature sensing switch 19 is in conductive status. When the temperature is greater than or equal to the threshold temperature, the temperature sensing switch 19 is switched to current-restriction status such as high resistance status or open circuit. In an embodiment, the temperature sensing switch 19 may be a metallic spring switch that is made by precision machine technologies, and is switched to current-restriction or conductive status according to thermal expansion or contraction. In another embodiment, the temperature sensing switch 19 is a thermistor switch of low-temperature material, and has a trip temperature lower than the trip temperature of the resistive device 11. When the temperature sensing switch 19 of low-temperature material is tripped, the resistance of the temperature sensing switch 19 will dramatically increase so as to tremendously decrease and restrict the current flowing therethrough. As a result, the temperature sensing switch 19 is in "current-restriction status." Open circuit is an extreme case of current-restriction status, and indicates that no current is allowed to go through the temperature sensing switch 19.

When the temperature sensing switch 19 is conductive, current theoretically will go through the first outer electrode 16, the conductive connecting member 18, and enter the resistive device 11 through the first electrode foil 12a and the second electrode foil 12b, respectively. Then, current flows out of the device 10 through the conductive layer 14 and the second outer electrode 17. According to the resistance formula for a wire: $R=\rho \times L/A$, where R is resistance, $\rho$ is resistivity, L is wire length, A is cross-sectional area of the wire, the resistance is smaller if the area current flowing therethrough is larger. In the case that the first electrode foil 12a, the resistive device 11 and the second conductive member 13 forms a first conductive path and the area of the first electrode foil 12a is A1, whereas the second electrode foil 12b, the resistive device 11 and the second conductive member 13 forms a second conductive path and the area of the second electrode foil 12b is area A2, the ratio of the area A1 of the first electrode foil 12a to the area A1+A2 of the first conductive member 12 is between 5% and 75%, and preferably between 10% and 50%. The area of the first electrode foil 12a is usually smaller than the area of the second electrode foil 12b, and thus the resistance of the first conductive path is greater than that of the second conductive path. When the temperature sensing switch 19 is conductive, the entire resistance $R=\rho \times L/(A1+A2)$ is lowest, and current flows through the first conductive path and the second conductive path simultaneously. Therefore, the device 10 has high hold current and high trip current. When over-current instantly flows through the first conductive path and the second conductive path, the resistive device 11 is tripped from low resistance status to high resistance status for over-current protection. When over-current is gone, the resistive device 11 is returned to low resistance status.

When the temperature reaches the threshold temperature of the temperature sensing switch 19, the temperature sensing switch 19 is switched to current-restriction status, thereby enforcing current to instantly flow through the first electrode foil 12a, the resistive device 11 and the second conductive member 13, i.e., the first conductive path with larger resistance. The current originally flowing through the second electrode foil 12b is forced to flow through the first electrode foil 12a instantly. Because the first conductive path has higher resistance, the resistance instantly increases to $R=\rho \times L/A1$. Consequently, current in the first conductive path rapidly generates heat, and the heat will increase the temperature. When the temperature reaches the trip temperature of the resistive device 11, the resistive device 11 is tripped from low resistance status to high resistance status. Accordingly, the first conductive path is in current-restriction status to restrict most of the current. When the temperature is decreased to be lower than the threshold temperature, the resistive device 11 is returned to low resistance status.

In other words, if the resistive device 11 uses high-temperature material with higher trip temperature and the threshold temperature of the temperature sensing switch 19 is lower than the trip temperature of the resistive device 11, the over-current protection device 10, like a high-temperature material device, has high hold current when the temperature sensing switch 19 is conductive. When the temperature sensing switch 19 is switched to current-restriction status, the temperature dramatically increases and consequently the resistive device 11 is tripped. The resistance is abruptly increased to restrict current so as to achieve device protection with low temperature trip function. In an embodiment, the threshold temperature of the temperature sensing switch 19 is between 60-90° C., preferably between 65-85° C., and most preferably between 70-80° C., whereas the trip temperature of the resistive device 11 is between 90-160° C. Because the threshold temperature of the temperature sensing switch 19 is lower than the trip temperature of the resistive device 11, the resistive device 11 can use high-temperature material and has low temperature trip function.

Figure 1C:
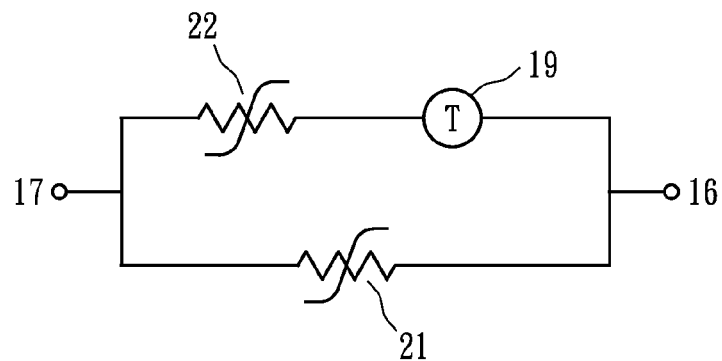

FIG. 1C shows a circuit diagram of the first embodiment of the present application. The first conductive path constituted of the first electrode foil 12a, the resistive device 11 and the second conductive member 13 includes a first resistor 21, and the second conductive path constituted of the second electrode foil 21b, the resistive device 11 and the second conductive member 13 includes a second resistor 22. In this embodiment, when the temperature does not reach the threshold temperature of the temperature sensing switch 19, because the resistance of the first resistor 21 is larger than that of the second resistor 22, most current will flow through the temperature sensing switch 19 and the second resistor 22. When instant over-current flows through the first and second conductive paths, the resistors 21 and 22 will change from low resistance status to high resistance status for over-current protection. When the temperature exceeds the threshold temperature of the temperature sensing switch 19, the temperature sensing switch 19 is switched to current-restriction status, and consequently the current is forced to be instantly flowed through the first resistor 21 and trips the resistive device 11. When the temperature is decreased to be lower than the threshold temperature of the temperature sensing switch 19, the resistive device 11 is returned to low resistance status.

Figure 2:
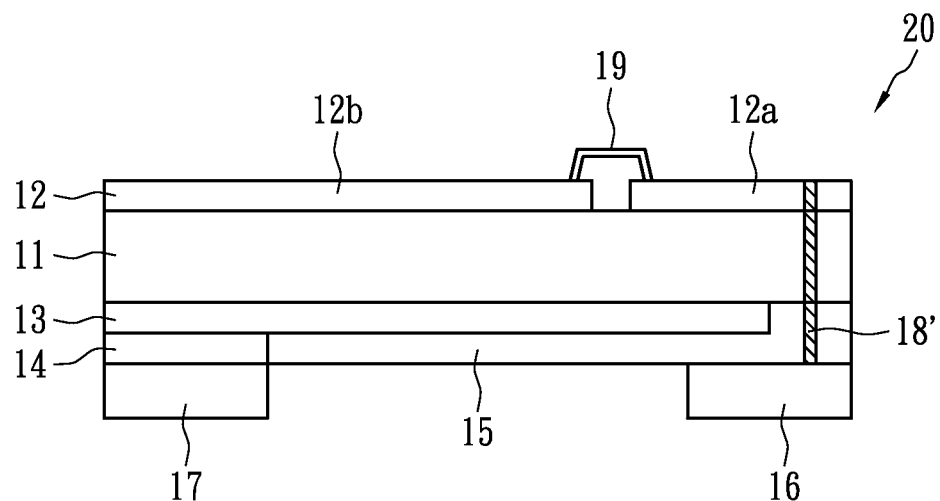
FIG. 2 shows an over-current protection device in accordance with a second embodiment of the present application.

FIG. 2 shows an over-current protection device 20 in accordance with a second embodiment of the present application. The over-current protection device 20 is similar to the over-current protection device 10 except that the semi-circular conductive hole placed at a side of the device 10 is replaced with an inner conductive connecting member 18', for example, a conductive through hole, for electrically connecting the first outer electrode 16 and the first electrode foil 12a. Accordingly, the over-current protection device 20 performs equivalent function as that the over-current protection device 10 does.

Figure 3:
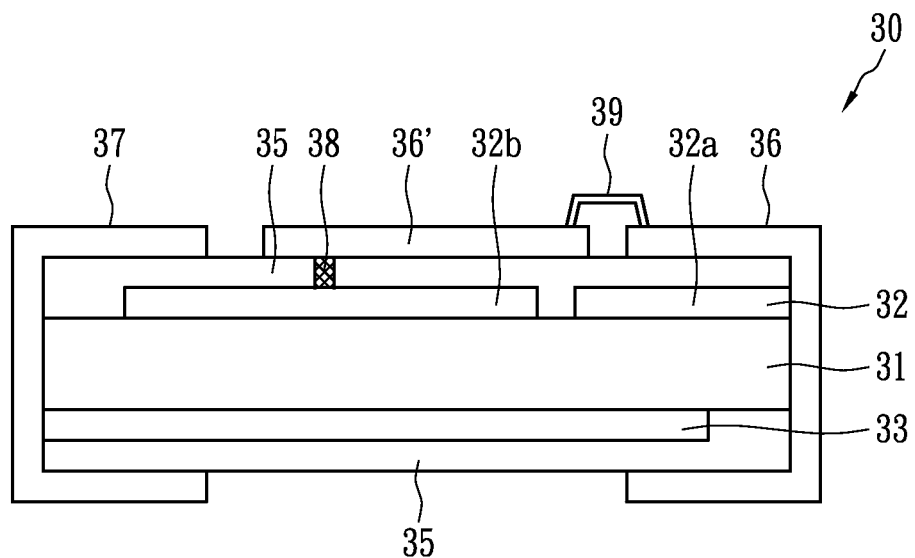
FIG. 3 shows an over-current protection device in accordance with a third embodiment of the present application.

FIG. 3 shows a surface-mount device (SMD) type over-current protection device 30, which essentially includes a resistive device 31, a first conductive member 32, a second conductive member 33, a first outer electrode 36, a second outer electrode 37 and a temperature sensing switch 39. The first conductive member 32 includes a first electrode foil 32a and a second electrode foil 32b formed on the same plane. In an embodiment, the area of the first electrode foil 32a is smaller than that of the second electrode foil 32b. The resistive device 31 is laminated between the first conductive member 32 and the second conductive member 33 and exhibits positive temperature coefficient or negative temperature coefficient behavior. The first electrode foil 32a and the second electrode foil 32b physically contact the upper surface of the resistive device 31, whereas the second conductive member 33 physically contacts the lower surface of the resistive device 31. The first electrode foil 32a and the second electrode foil 32b are separated by a gap. The first outer electrode 36 and the second conductive member 33 are electrically separated by an insulative layer 35, whereas the second outer electrode 37 and the first conductive member 32 are electrically separated by another insulative layer 35 also. The first outer electrode 36 and the second outer electrode 37 are disposed at two sides of the over-current protection device 30, respectively. The first outer electrode 36 physically contacts the first electrode foil 32a, and the second outer electrode 37 physically contacts the second conductive member 33. An electrode extending member 36' is disposed next to the first outer electrode 36, and may be electrically connected to the second electrode foil 32b through a conductive post 38 or a conductive hole. The temperature sensing switch 39 switches the electrode extending member 36' and the first outer electrode 36 between the electrically conductive status and the current-restriction status.

When the temperature does not reach the threshold temperature of the temperature sensing switch 39, the temperature sensing switch 39 electrically connects the first outer electrode 36 and the electrode extending member 36'. Because the area of the first electrode foil 32a is smaller than that of the second electrode foil 32b, most current will flow through a conductive path including the first outer electrode 36, the temperature sensing switch 39, the electrode extending member 36', the conductive post 38, the second electrode foil 32b, the resistive device 31, the second conductive member 33 and the second outer electrode 37. When over-current instantly goes through the conductive path, the resistive device 31 is tripped from low resistance status to high resistance status for over-current protection. When the over-current is gone, the resistive device 31 is returned to low resistance status.

When the temperature exceeds the threshold temperature of the temperature sensing switch 39, the temperature sensing switch 39 will be in current-restriction status. As a result, current is forced to go through the conductive path including the first outer electrode 36, the first electrode foil 32a, the resistive device 31, the second conductive member 33 and the second outer electrode 37, and trips the resistive device 31. When the temperature is decreased to be lower than the threshold temperature, the resistive device 31 is returned to low resistance status.

Figure 4:
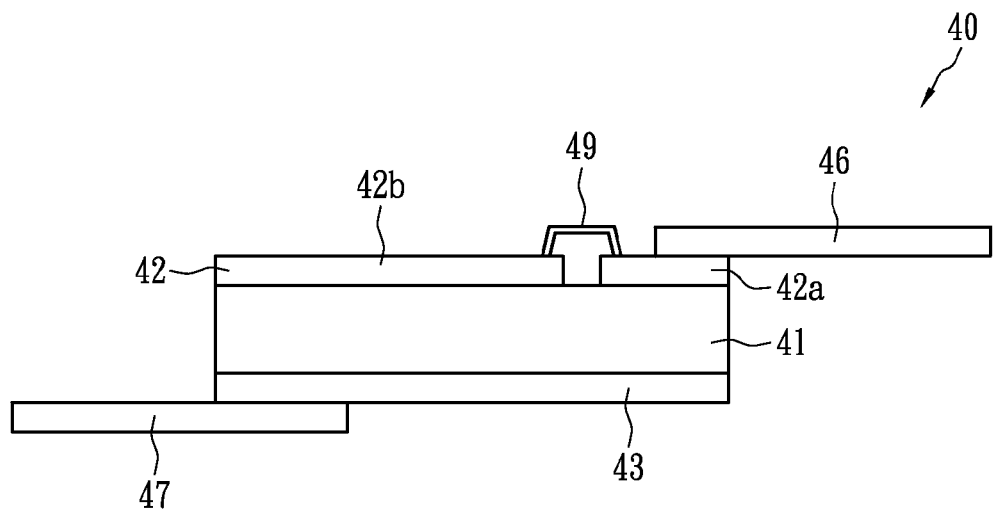
FIG. 4 shows an over-current protection device in accordance with a fourth embodiment of the present application.

FIG. 4 shows an axial over-current protection device in accordance with another embodiment. An over-current protection device 40 includes a resistive device 41, a first conductive member 42, a second conductive member 43, a first outer electrode 46, a second outer electrode 47 and a temperature sensing switch 49. The first conductive member 42 includes a first electrode 42a and a second electrode foil 42b those are formed on a same plane. In an embodiment, the area of the first electrode foil 42a is smaller than that of the second electrode foil 42b. The resistive device 41 is laminated between the first conductive member 42 and the second conductive member 43, and exhibits positive temperature coefficient or negative temperature coefficient behavior. The first electrode foil 42a and the second electrode foil 42b physically contact the upper surface of the resistive device 41, whereas the second conductive member 43 physically contacts the lower surface of the resistive device 41. The first electrode foil 42a and the second electrode foil 42b are separated by a gap.

When the temperature does not reach the threshold temperature of the temperature sensing switch 49, the temperature sensing switch 49 electrically connects the first electrode foil 42a and the second electrode foil 42b. Because the area of the first electrode foil 42a is smaller than that of the second electrode foil 42b, most current will flow through a conductive path including the first outer electrode 46, the temperature sensing switch 49, the second electrode foil 42b, the resistive device 41, the second conductive member 43 and the second outer electrode 47. When over-current instantly goes through the conductive path, the resistive device 41 is tripped from low resistance status to high resistance status for over-current protection. When the over-current is gone, the resistive device 41 is returned to low resistance status.

When the temperature exceeds the threshold temperature of the temperature sensing switch 49, the temperature sensing switch 49 will be in current-restriction status. As a result, current is forced to go through the conductive path including the first outer electrode 46, the first electrode foil 42a, the resistive device 41, the second conductive member 43 and the second outer electrode 47, and trips the resistive device 41. When the temperature is decreased to be lower than the threshold temperature, the resistive device 41 is returned to low resistance status.

Figure 5:
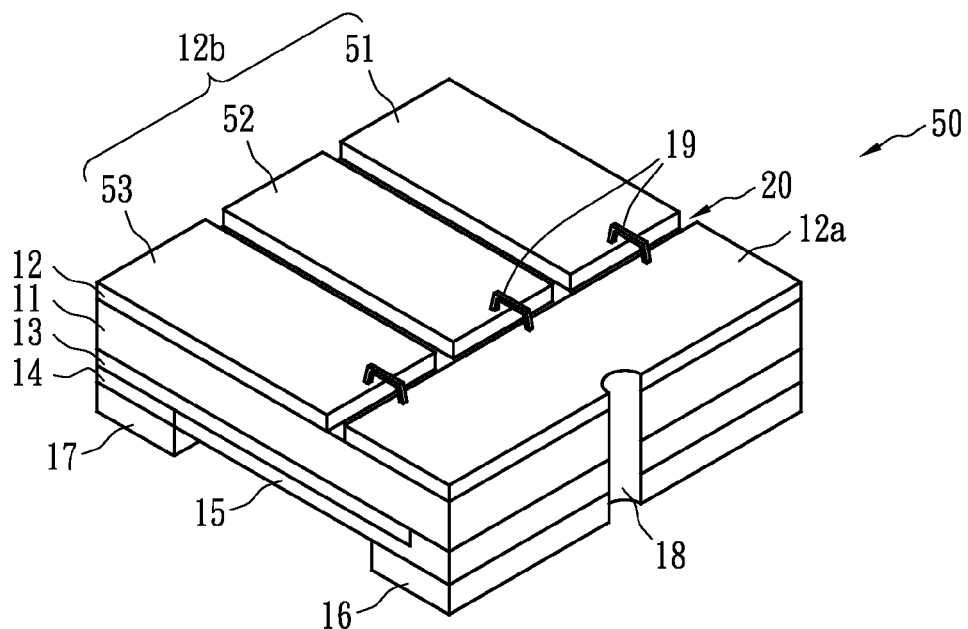
FIG. 5 shows an over-current protection device in accordance with a fifth embodiment of the present application.

Referring to FIG. 5, an over-current protection device 50 is a variation of the over-current protection device 10 in FIG. 1. The over-current protection device 50 is similar to the over-current protection device 10 except that the second electrode foil 12b is constituted by a first foil 51, a second foil 52 and a third foil 53. The foils 51, 52 and 53 are separated by gaps and may be connected to the first electrode foil 12a through temperature sensing switches 19. If the total area of the foils 51, 52 and 53 is equal to area of the second electrode foil 12b, when the temperature sensing switch 19 is conductive, most current, according to divided flow rule, goes through the first foil 51, the second foil 52 and the third foil 53, and then goes through the resistive device 11 and the second conductive member 13. This conductive path is substantially equivalent to the second conductive path of the over-current protection device 10, so that the over-current protection device 10 can provide equivalent function as that the over-current protection device 10 does. In practice, the first electrode foil 12a may be divided into many pieces, and can provide equivalent function if they can form a path equivalent to the first conductive path.

Accordingly, the area of the first electrode foil includes the effective area of the first conductive member in the first conductive path, and the area of the second electrode foil includes the effective area of the first conductive member in the second conductive path.

When the over-current protection device is at low temperature or operates in a normal state, most current goes through the conductive path of smaller resistance. When the temperature exceeds the threshold temperature of the temperature sensing switch, the temperature sensing switch is switched to current-restriction status. As a result, current is forced to instantly flow through the conductive path of larger resistance, and consequently the resistive device is tripped, so as to achieve the objective of over-current protection. According to the present application, conductive paths of different resistances are formed by using different areas of electrode foils of the over-current protection device, by which the resistive device can use high-temperature material to obtain high hold current, and have low temperature trip function.

The above-described embodiments of the present invention are intended to be illustrative only. Numerous alternative embodiments may be devised by persons skilled in the art without departing from the scope of the following claims.

We claim:

1. An over-current protection device, comprising:
a first conductive member comprising a first electrode foil and a second electrode foil, wherein the first electrode foil and the second electrode foil are formed on a same plane;
a second conductive member;
a resistive device exhibiting positive temperature coefficient or negative temperature coefficient and being laminated between the first conductive member and the second conductive member; and
a temperature sensing switch configured to switch the first electrode foil and the second electrode foil between conductive status and current-restriction status according to temperature variation;
wherein a threshold temperature of the temperature sensing switch is lower than a trip temperature of the resistive device;
when the temperature sensing switch is in conductive status, current goes through a conductive path of the first electrode foil, the resistive device and the second conductive member and a conductive path of the second electrode foil, the resistive device and the second conductive member; when over-current occurs in the conductive paths, the resistive device is tripped from low resistance status to high resistance status for over-current protection; when the over-current is gone, the resistive device is returned to low resistance status;
when a temperature of the temperature sensing switch exceeds the threshold temperature, the temperature sensing switch is switched to current-restriction status, current instantly goes through a conductive path of the first electrode foil, the resistive device and the second conductive member and generates heat to trip the resistive device from low resistance to high resistance status; when the temperature is decreased to below the threshold temperature, the resistive device is returned to low resistance status.

2. The over-current protection device of claim 1, wherein the threshold temperature is between 60° C. and 90° C.

3. The over-current protection device of claim 1, wherein the threshold temperature is between 65° C. and 85° C.

4. The over-current protection device of claim 1, wherein the trip temperature is between 90° C. and 160° C.

5. The over-current protection device of claim 1, wherein the first electrode foil, the resistive device and the second conductive member form a first conductive path, the second electrode foil, the resistive device and the second conductive member form a second conductive path, the area of the first electrode foil includes an effective area of the first conductive member in the first conductive path, and the area of the second electrode foil includes an effective area of the first conductive member in the second conductive path.

6. The over-current protection device of claim 5, wherein the area of the first electrode foil is 5% to 75% of the area of the first conductive member.

7. The over-current protection device of claim 5, wherein the area of the first electrode foil is 10% to 50% of the area of the first conductive member.

8. The over-current protection device of claim 1, wherein the first electrode foil and the second electrode foil physically contact an upper surface of the resistive device, the second conductive member physically contacts a lower surface of the resistive device, and the first electrode foil and the second electrode foil are separated by a gap.

9. The over-current protection device of claim 1, wherein the temperature sensing switch is disposed on a surface of the first conductive member.

10. The over-current protection device of claim 1, wherein the over-current protection device is of surface-mount device type or axial type.

11. The over-current protection device of claim 1, further comprising a first outer electrode and a second outer electrode, wherein the first outer electrode is electrically connected to the first electrode foil, and the second outer electrode is electrically connected to the second conductive member.

12. The over-current protection device of claim 11, further comprising a conductive connecting member that connects the first outer electrode and the first electrode foil.

13. The over-current protection device of claim 11, wherein the first outer electrode and the second outer electrode are at a same side of the second conductive member.

14. The over-current protection device of claim 11, further comprising an electrode extending member, wherein the electrode extending member is electrically connected to the second electrode foil, the first outer electrode and the second outer electrode are disposed at two sides of the over-current protection device, respectively; the first outer electrode physically contacts the first electrode foil, the second outer electrode physically contacts the second conductive member, and the temperature sensing switch is configured to switch the electrode extending member and the first outer electrode between conductive status and current-restriction status.

15. The over-current protection device of claim 14, wherein the electrode extending member and the second electrode foil are electrically connected through a conductive post.

16. The over-current protection device of claim 14, wherein the temperature sensing switch is disposed on surfaces of the first outer electrode and the electrode extending member.

17. The over-current protection device of claim 1, wherein the temperature sensing switch is a metal spring switch or a thermistor switch.

\* \* \* \* \*